United States Patent
Takahashi (10) Patent No.: US 7,410,729 B2
(45) Date of Patent: Aug. 12, 2008

(54) NONAQUEOUS ELECTROLYTE CELL WITH IMPROVED HIGH TEMPERATURE CHARACTERISTICS

(75) Inventor: Kentaro Takahashi, Sumoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 594 days.

(21) Appl. No.: 10/948,301

(22) Filed: Sep. 24, 2004

(65) Prior Publication Data

US 2005/0069766 A1 Mar. 31, 2005

(30) Foreign Application Priority Data

Sep. 29, 2003 (JP) ............................. 2003-337783

(51) Int. Cl.
*H01M 6/18* (2006.01)

(52) U.S. Cl. ..................... 429/304; 429/309; 429/317; 429/303

(58) Field of Classification Search .................. 429/309, 429/317, 189, 306, 303, 231.8, 300
See application file for complete search history.

(56) References Cited

U.S. PATENT DOCUMENTS

| 6,534,218 B1 | 3/2003 | Okada et al. | |
| 2003/0091901 A1* | 5/2003 | Kaneda et al. | ........... 429/231.4 |

FOREIGN PATENT DOCUMENTS

| JP | 9-147912 A | 6/1997 |
| JP | 2000-311516 A | 11/2000 |
| JP | 2002-33016 A | 1/2002 |
| JP | 2002-33017 A | 1/2002 |
| JP | 2002-352852 A | 12/2002 |

* cited by examiner

*Primary Examiner*—Raymond Alejandro
(74) *Attorney, Agent, or Firm*—Westerman, Hattori, Daniels & Adrian, LLP.

(57) ABSTRACT

A non-aqueous electrolyte cell that excels in the high-temperature cycle characteristics and that is without the possibility of solution leakage. The non-aqueous electrolyte cell includes a polymer electrolyte. This polymer electrolyte is a polymerization of a prepolymer included in a prepolymer electrolyte that includes a non-aqueous solvent, an electrolyte salt, and the prepolymer. The prepolymer includes a polyester-based monomer. The polymer electrolyte further includes a vinylene carbonate derivative and cyclic acid anhydride.

5 Claims, 2 Drawing Sheets

NONAQUEOUS ELECTROLYTE CELL WITH IMPROVED HIGH TEMPERATURE CHARACTERISTICS

BACKGROUND OF THE INVENTION (1) Field of the Invention

The present invention relates to an improvement of non-aqueous electrolyte cells for the purpose of improving the high-temperature cycle characteristics.

(2) Description of the Prior Art

In recent years, there has been a rapid reduction in the size and weight of mobile information terminals such as mobile telephones and notebook personal computers. Under the circumstances, much attention is being paid to non-aqueous electrolyte cells that utilize gelled non-aqueous electrolytes (polymer electrolytes).

The non-aqueous electrolyte cells use a gelled non-aqueous electrolyte for the electrolyte and hence do not suffer solution leakage, making it possible to use a more lightweight outer casing body such as an aluminum laminate film. Such cells realize a significant reduction in weight compared with known cells using metal cans.

The non-aqueous electrolyte cells use a prepolymer electrolyte that is a mixture of a non-aqueous solvent, an electrolyte salt, and a polyether-based monomer (prepolymer). The polyether-based monomer has at its molecular edge a polymerizable functional group such as acrylate and methacrylate. The cells are produced by polymerizing the prepolymer within the cell outer casing bodies with the use of heat, UV rays, a polymerization initiator, or the like. The non-aqueous electrolyte cells thus obtained excel in ion conductivity.

However, the non-aqueous solvent contained in the gelled non-aqueous electrolyte is problematic in that it is reduced and decomposed at the negative electrode, and thus causes gas generation. With the progress of the charge and discharge cycles, the gas accumulates between the electrode and the electrolyte and thus degrades the contactivity thereof. This increases internal resistance, resulting in degraded cell cycle characteristics.

Known techniques to inhibit the degradation of the cycle characteristics attributed to the above reason include adding vinylene carbonate derivatives in the electrolyte. According to this technique, the vinylene carbonate reacts with the negative electrode and forms a stable coating film thereon, which inhibits the reaction of the negative electrode and the non-aqueous electrolyte. This is claimed to reduce gas generation. However, this technique presents another problem; the vinylene carbonate is oxidized and decomposed at the positive electrode, again resulting in gas generation.

Techniques to enhance the ion conductivity of a high-molecular solid electrolyte include one disclosed by patent document 1. This is a technique of blending a metal salt of Ia group of the periodic table in a polymer of polyester (meth) acrylate in which at least part of the hydroxyl groups of polyester polyol is converted into (meth)acrylic ester. Patent document 1 thus tries to obtain a flexible high-molecular solid electrolyte that has high ion conductivity and electrochemical stability.

Patent document 1: Japanese Unexamined Patent Publication No. 2000-311516 (Abstract)

However, even the high-molecular solid electrolyte obtained by this technique is reduced and decomposed at the negative electrode when temperature becomes high, which still causes gas generation. This reduces the contactivity of the electrode and the electrolyte, resulting in degraded cycle characteristics. Thus, this technique is still problematic.

SUMMARY OF THE INVENTION

It is an object of the present invention to improve the high-temperature cycle characteristics.

In order to accomplish the above object, a first aspect of the present invention provides the following structure.

1) A non-aqueous electrolyte cell comprising: a positive electrode; a negative electrode; and a polymer electrolyte, wherein: the polymer electrolyte is a polymerization of a prepolymer included in a prepolymer electrolyte, the prepolymer electrolyte including a non-aqueous solvent, an electrolyte salt, and the prepolymer; the prepolymer includes a polyester-based monomer; and the prepolymer electrolyte further includes a vinylene carbonate derivative and cyclic acid anhydride.

According to this structure, the vinylene carbonate (VC) forms a coating film on the negative electrode and thus inhibits the reaction of the non-aqueous solvent and the negative electrode, as described above.

Additionally, the functional group that is derived from the polyester-based monomer in the polymer formed by polymerising the polyester-based monomer inhibits the oxidation and decomposition of the vinylene carbonate. The reason for such an effect is yet to be determined; however, it is speculated that the oxidation-decomposition product of the functional group derived from the polyester-based monomer accumulates on the positive electrode surface and thus inhibits the reaction of the vinylene carbonate and the positive electrode.

However, even though the vinylene carbonate is contained, the functional group derived from the polyester-based monomer reacts with the negative electrode to be reduced and decomposed, thereby degrading cell performance. The reason for this is yet to be determined; however, it is speculated that the reduction-decomposition potential of the functional group derived from the polyester-based monomer is higher than that of the vinylene carbonate, and hence the functional group derived from the polyester-based monomer is decomposed prior to the decomposition of the vinylene carbonate, which results in increased internal resistance.

If the polymer electrolyte further includes cyclic acid anhydride, the reduction and decomposition of the polyester-based polymer is inhibited. The reason for this is again yet to be determined; however, it is speculated that the cyclic acid anhydride is reduced and decomposed at a higher potential than those of the vinylene carbonate derivative and the functional group derived from the polyester-based monomer. This causes formation of a coating film on the negative electrode surface, which is believed to inhibit the reaction of the functional group derived from the polyester-based monomer and the negative electrode.

A cell using a polymer electrolyte that is formed by polymerizing a prepolymer including the above two additives (vinylene carbonate and cyclic acid anhydride) and the polyester-based monomer is virtually free from decomposition and gas generation, and thus realizes high cycle characteristics. In general, such a decomposition reaction occurs especially under high temperature conditions. With the above structure, the inventive cell sufficiently inhibits the decomposition reaction, thereby significantly increasing the high-temperature cycle characteristics.

2) In the first aspect, the cyclic acid anhydride may be a compound represented by the following Formula 1.

Formula 1 where n=0 to 4; R1, R2, R3, and R4 are independently a hydrogen atom, an alkyl group (straight chained or branched), an alkenyl group, or an aryl group; and R5 and R6 are independently a hydrogen atom or an alkyl group (straight chained or branched) with four or less carbon atoms in every repeat unit.

When the cyclic acid anhydride is of the structure represented by Formula 1, there is an increased effect of improving the high-temperature cycle characteristics, for some reason yet to be determined. Examples of the acid anhydride of this structure include succinic acid anhydride, glutaric acid anhydride, glycolic acid anhydride, and the like.

3) In the first aspect, an active material for the negative electrode may be a carbonaceous substance with a d(002) value of 0.340 nm or lower.

When the negative electrode active material is a carbonaceous substance with a d(002) value of 0.340 nm or lower, a larger cell capacity is obtained than when using a carbonaceous substance with a d(002) value of over 0.340 nm. When the d(002) value is 0.340 nm or lower, the carbonaceous substance has the increased effect of decomposing the polyester-based polymer. According to the present invention, however, the cyclic acid anhydride significantly inhibits the decomposition of the polyester-based polymer, and hence a large cell capacity is obtained without compromising the high-temperature cycle characteristics.

4) In structure (1), the prepolymer may further include polyether acrylate and/or polyether methacrylate.

When a mixture of a polymer (polyether-based polymer) formed by polymerizing polyether acrylate and/or polyether methacrylate and the polyester-based polymer is used, the mixture interacts with the non-aqueous solvent in a more active manner, thereby realizing a uniform polymer electrolyte with less phase separation. This inhibits uneven reactions in the cell, resulting in improved charge and discharge characteristics (cycle characteristics).

Thus, when a sufficient amount of the polyester-based monomer enough to inhibit the decomposition of the vinylene carbonate is mixed with the polyether monomer, and when the resulting mixture is polymerized to obtain a polymer for use in a cell, then such a cell is a non-aqueous electrolyte cell provided with charge and discharge characteristics and with the effect of inhibiting the decomposition of the vinylene carbonate.

DESCRIPTION OF THE PREFERRED EMBODIMENTS

Embodiments of the present invention will be described in detail with reference to the drawings. Note that the present invention is not limited to the following embodiments; it should be appreciated that variations are possible without departing from the scope of the invention.

Figure 1:
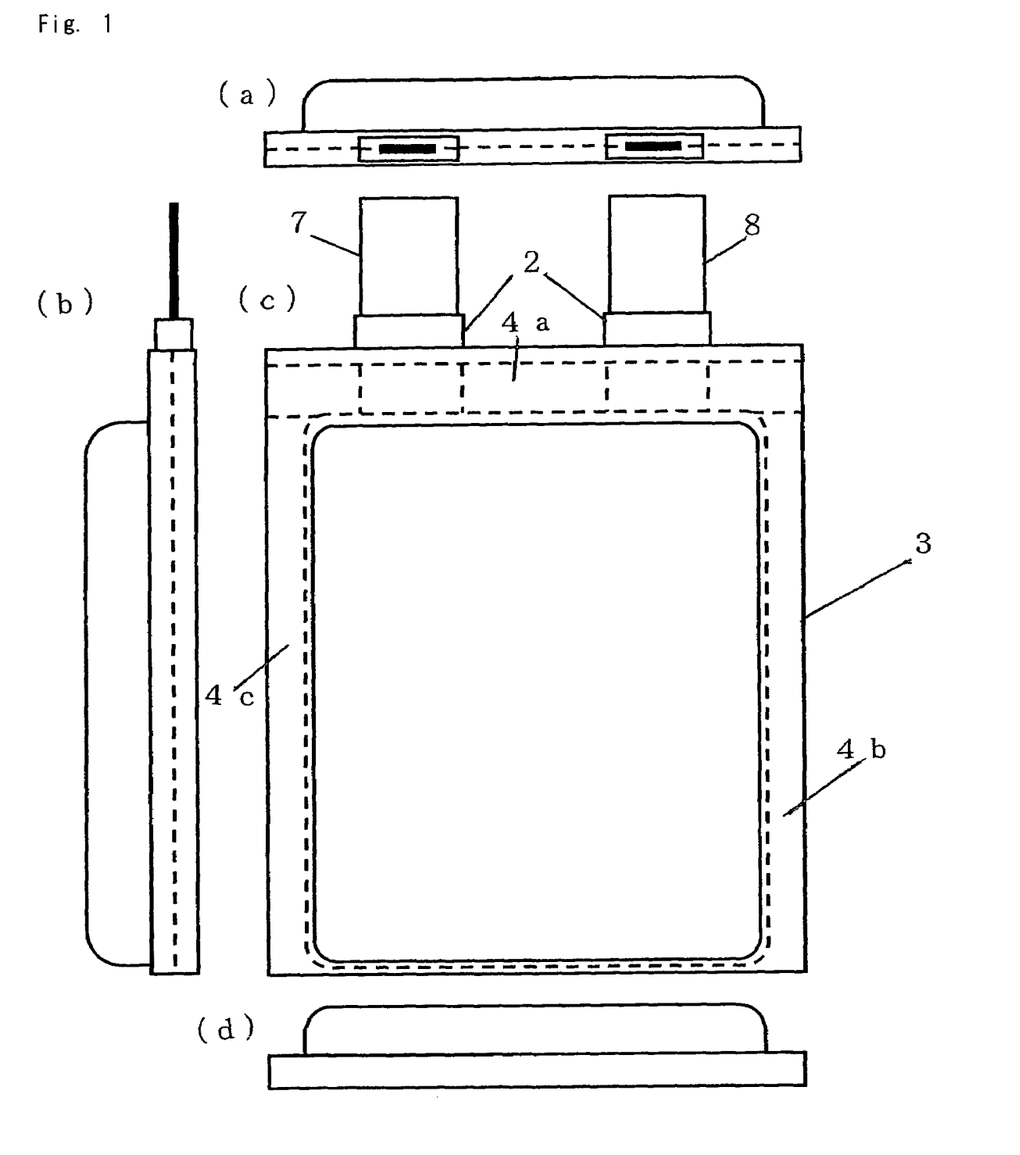
FIG. 1 is a front view of a non-aqueous electrolyte cell according to the present invention.
Figure 2:
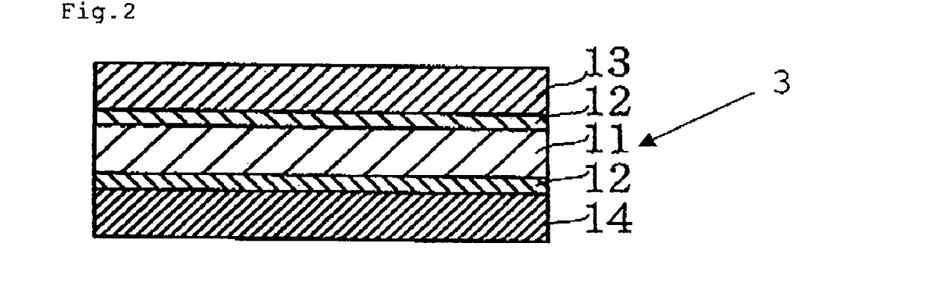
FIG. 2 is a sectional view of a laminate outer casing body used for the non-aqueous electrolyte cell according to the present invention.
Figure 3:
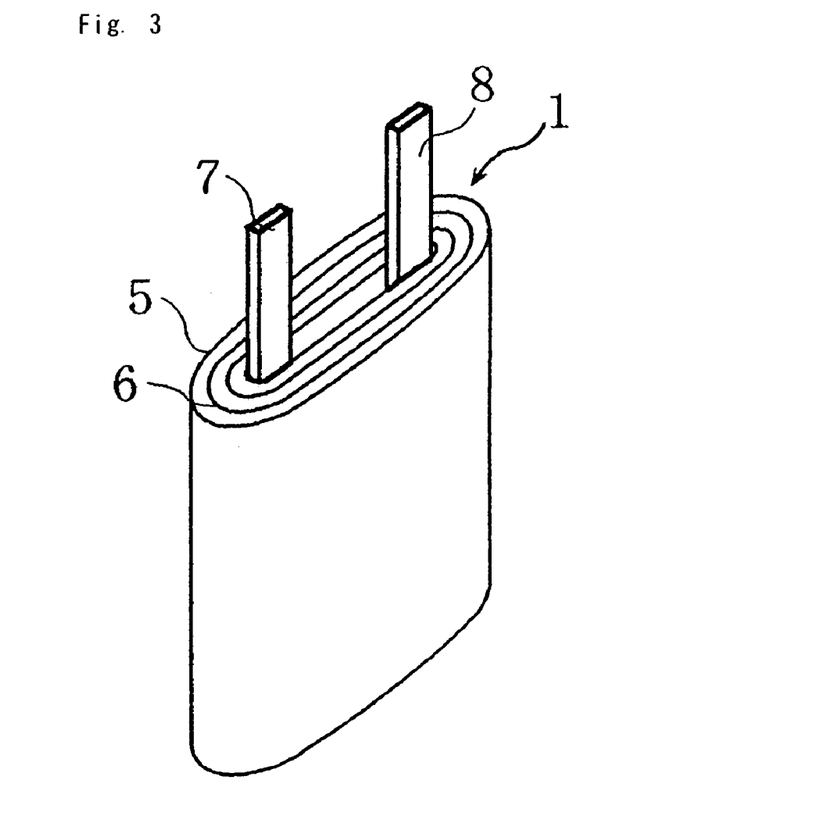
FIG. 3 is a perspective view of an electrode body according to the present invention.

FIG. 1 is a front view of a gelled non-aqueous electrolyte cell using a laminate outer casing body according to the embodiment of the present invention. FIG. 2 is a sectional view of the laminate outer casing body used for the gelled non-aqueous electrolyte cell. FIG. 3 is a perspective view of an electrode body used for the non-aqueous electrolyte cell.

The non-aqueous electrolyte cell of the present invention includes an electrode body shown in FIG. 3 which is placed in the storage space of the laminate outer casing body. As shown in FIG. 1, this storage space is formed by folding a laminate outer casing body 3 in half and sealing the top and both side edges at sealed portions 4a, 4b, and 4c. The storage space includes, as well as the electrode body 1, a polymer electrolyte in which a lithium salt (electrolyte salt) is dissolved in a non-aqueous solvent having a polymer. As shown in FIG. 3, the electrode body 1 is prepared by winding together a positive electrode 5, a negative electrode 6, and a separator (not shown) that separates the positive and negative electrodes into a flat wound shape. The separator is formed of a finely porous film (0.025 mm thick) made of an olefin-based resin, which is cheap and not highly reactive to organic solvents.

The positive electrode 5 is connected to a positive lead 7 made of aluminum, and the negative electrode 6 is connected to a negative lead 8 made of copper. This enables chemical energy generated inside the cell to be extracted as electric energy.

As shown in FIG. 2, the laminate outer casing body 3 has a five-layer structure in which a resin layer 13 (nylon), an adhesive layer 12, an aluminum layer 11 (30 μm thick), an adhesive layer 12, and a resin layer 14 (polypropylene) are adhered. It should be noted, however, that the laminate outer casing body 3 is not limited to this structure.

The polymer electrolyte is formed by polymerizing a prepolymer electrolyte including a non-aqueous solvent, an electrolyte salt, vinylene carbonate, cyclic acid anhydride, and a prepolymer having a polyester-based monomer.

Method of Cell Preparation

A method of preparing the cell to practice the present invention will be described.

Preparation of Positive Electrode

An active material slurry was obtained by mixing 92 parts by mass of a positive electrode active material made of lithium cobalt oxide ($LiCoO_2$), 5 parts by mass of a conductivity enhancer made of acetylene black, 3 parts by mass of a binder made of polyvinylidene fluoride (PVdF), and N-methyl-2-pyrrolidone (NMP).

This active material slurry was uniformly applied on both sides of a positive electrode substrate made of an aluminum foil of 20 μm thick by a doctor blade, and then was dried by passing it through the inside of a heated dryer. By this drying step, the organic solvent required in the step of preparing the slurry was removed. Subsequently, the electrode plate was rolled with a roll press machine to a thickness of 0.17 mm, and thus, the positive electrode 5 was prepared.

Preparation of Negative Electrode

An active material slurry was prepared by mixing a negative electrode active material made of graphite (d(002)=0.335 nm), a binder made of polyvinylidene fluoride (PVdF), and N-methyl-2-pyrrolidone (NMP). This active material slurry was uniformly applied on both sides of a negative electrode substrate made of a copper foil of 20 μm thick by a doctor blade, and then was dried by passing it through the inside of a heated dryer. By this drying step, the organic solvent required in the step of preparing the slurry was removed. Subsequently, the electrode plate was rolled with a roll press machine to a thickness of 0.14 mm, and thus, the negative electrode 6 was prepared.

Preparation of Prepolymer Electrolyte

A mixture solvent was prepared by mixing ethylene carbonate and diethyl carbonate at a mass ratio of 3:7. $LiPF_6$ serving as the electrolyte salt was dissolved in this mixture solvent at 1M (mole/liter). Thus, the electrolyte solution was prepared. Fifteen parts by mass of this electrolyte solution was mixed with 1 part by mass of a polymerizable monomer. One hundred parts by mass of the resulting solution was mixed with 1 part by mass of vinylene carbonate (VC). Further, t-butyl peroxy pivalate serving as a polymerization initiator was added to the solution at 5000 ppm. Thus, the prepolymer electrolyte was prepared.

Preparation of Electrode Body

The positive electrode lead 7 and the negative electrode lead 8 were attached respectively to the positive and negative electrodes, to which a protection tape 2 made of polyphenyl sulfide was further adhered. The electrodes were overlapped with each other with the separator made of a finely porous film (0.025 mm thick) of olefin-based resin between the electrodes. The overlapping was performed in such a manner that the center lines in the width direction of the electrodes would agree. Then, the electrodes were wound with a winding device and the outermost surface was taped. Thus, the flat wound electrode body 1 was prepared.

A five-layer laminate material in the form of sheet shown in FIG. 2 was prepared. This aluminum laminate material was folded in half so that the edges and the corners would exactly meet, resulting in top and side edges 4a, 4b, and 4c. The electrode body 1 was inserted into the storage space of the folded aluminum laminate material in such a manner that the positive and negative electrode leads 7 and 8 would protrude from the top edge of the laminate material. The top edge 4a, from which the positive and negative electrode leads 7 and 8 protruded, and the one side edge 4b were welded. The pre-gelled solution was injected from the opening that was yet to be welded (the portion corresponding to the sealed portion 4c after sealing the cell), and the sealed portion 4c was then welded. The sealing of each edge was performed with a high-frequency induction welding device.

The aluminum laminate body, in which the pre-gelled solution has been injected and all the sealed portions have been sealed, was held in a thermostatic chamber of 60° C. for three hours, and whereby the polymerized monomer was allowed to polymerize. Thus, the non-aqueous electrolyte cell was prepared.

While in this embodiment the slurry was applied with a doctor blade, a die coater may perform this task. Instead of an active material slurry, an active material paste may be used, which would be applied by the roller coating method. The use of an aluminum mesh provides the same results as when using an aluminum foil.

The present invention will be further detailed with the use of Examples.

EXAMPLES 1 TO 17, COMPARATIVE EXAMPLES 1 TO 9

As shown in Tables 1 and 2, cells were prepared in the same manner as that described above except for changes in the positive electrode active material, the prepolymer, its composition ratio, the added amount of the vinylene carbonate, the cyclic acid anhydride, and its amount.

With the use of the cells of Examples 1 to 17 and Comparative Examples 1 to 9, the high-temperature (70° C.) cycle characteristics were measured. The results are listed in Tables 1 and 2.

High-Temperature Cycle Characteristics Tests
1. Charge at 1 I t (500 mA) to 4.2 V, and then at 4.2 V for 3 hrs. in total.
2. 10 minutes' intermission.
3. Discharge at 1 I t (500 mA) to 2.75 V
4. 10 minutes' intermission. Then back to 1.

High-temperature cycle characteristics (%): (500-cycle discharge capacity÷1-cycle discharge capacity)×100

TABLE 1

| | Positive electrode active material | Polyester-based monomer | | Polyether-based monomer | VC (%) | Cyclic acid anhydride | | High-temp. characteristics (%) |
| | | Monomer 1 | Monomer 2 | | | Kind | Amount (%) | |
|---|---|---|---|---|---|---|---|---|
| Ex. 1 | X | Equation 1: 20 v % | Equation 3: 80 v % | | 1.0 | A | 1.5 | 76 |
| Ex. 2 | X | Equation 1: 20 v % | Equation 3: 80 v % | | 1.0 | A | 1.5 | 74 |
| Ex. 3 | X | Equation 2: 100 v % | | | 1.0 | A | 1.5 | 77 |
| Ex. 4 | X | Equation 2: 70 v % | Equation 3: 30 v % | | 1.0 | A | 1.5 | 77 |
| Ex. 5 | X | Equation 2: 70 v % | Equation 3': 30 v % | | 1.0 | A | 1.5 | 74 |
| Ex. 6 | X | | Equation 3": 100 v % | | 1.0 | A | 1.5 | 75 |
| Ex. 7 | X | | Equation 4: 100 v % | | 1.0 | A | 1.5 | 73 |
| Ex. 8 | X | | Equation 3: 30 v % | Equation 6: 70 v % | 1.0 | A | 1.5 | 81 |
| Ex. 9 | X | | Equation 3: 50 v % | Equation 6: 50 v % | 1.0 | A | 1.5 | 80 |
| Ex. 10 | X: 50 v % Y: 50 v % | | Equation 3: 30 v % | Equation 6: 70 v % | 1.0 | A | 1.5 | 67 |

TABLE 1-continued

| | Positive electrode active material | Polyester-based monomer | | Polyether-based monomer | VC (%) | Cyclic acid anhydride | | High-temp. characteristics (%) |
| | | Monomer 1 | Monomer 2 | | | Kind | Amount (%) | |
|---|---|---|---|---|---|---|---|---|
| Ex. 11 | X | | Equation 3: 30 v % | Equation 6: 70 v % | 0.5 | A | 1.5 | 78 |
| Ex. 12 | X | | Equation 3: 30 v % | Equation 6: 70 v % | 2.0 | A | 1.5 | 82 |
| Ex. 13 | X | | Equation 3: 30 v % | Equation 6: 70 v % | 1.0 | B | 1.5 | 79 |
| Ex. 14 | X | | Equation 3: 30 v % | Equation 6: 70 v % | 1.0 | C | 1.5 | 78 |
| Ex. 15 | X | | Equation 3: 30 v % | Equation 6: 70 v % | 1.0 | A | 0.5 | 72 |
| Ex. 16 | X | | Equation 3: 30 v % | Equation 6: 70 v % | 1.0 | A | 1.0 | 76 |
| Ex. 17 | X | | Equation 3: 30 v % | Equation 6: 70 v % | 1.0 | A | 2.0 | 80 |

TABLE 2

| | Positive electrode active material | Polyester-based monomer | | Polyether-based monomer | VC (%) | Cyclic acid anhydride | | High-temp. characteristics (%) |
| | | Monomer 1 | Monomer 2 | | | Kind | Amount (%) | |
|---|---|---|---|---|---|---|---|---|
| Com. Ex. 1 | X | | Equation 3: 30 v % | Equation 6: 70 v % | — | — | — | 44 |
| Com. Ex. 2 | X | | Equation 3: 30 v % | Equation 6: 70 v % | 1.0 | — | — | 48 |
| Com. Ex. 3 | X: 50 v % Y: 50 v % | | Equation 3: 30 v % | Equation 6: 70 v % | 1.0 | — | — | 39 |
| Com. Ex. 4 | X | | Equation 3: 30 v % | Equation 6: 70 v % | — | A | 1.5 | 53 |
| Com. Ex. 5 | X | | | Equation 6: 100 v % | — | — | — | 32 |
| Com. Ex. 6 | X | | | Equation 6: 100 v % | 1.0 | — | — | 41 |
| Com. Ex. 7 | X | | | Equation 6: 100 v % | 1.0 | — | — | 35 |
| Com. Ex. 8 | X | | | Equation 6: 100 v % | — | A | 1.5 | 40 |
| Com. Ex. 9 | X | | | Equation 6: 100 v % | 1.0 | A | 1.5 | 43 |

In Tables 1 and 2, X stands for $LiCoO_2$, Y stands for $LiMn_2O_4$, A for succinic acid anhydride, B for glutaric acid anhydride, and C for glycolic acid anhydride. The unit v % indicates percent by volume. The structures of Formulas 1 to 4 and 6 are as follows.

$$CH2=CR-CO-(O-A1-CO)m-O-R1 \quad \text{Formula 1}$$

R:H, R1:$CH_3$, A1:$C_5H_{10}$, m=6

$$CH2=CR-CO-(O-A1-CO)m-CH2-CH2-(CO-A1-O)m-CO-CR=CH2 \quad \text{Formula 2}$$

R:H, A1:$C_5H_{10}$, m=4

Formula 3

R: H, A1: $C_5H_{10}$, m = 2

Formula 3'

R: $CH_3$, A1: $C_5H_{10}$, m = 2

Formula 3''

R: $CH_3$, A1: $C_5H_{10}$, m = 4

Formula 4

R: H, A1: $C_5H_{10}$, m = 4

Formula 6

R:H, A2:$C_3H_6$, m=4

1) As shown in Tables 1 and 2, the cells of Examples 1 to 7, where only polyester-based monomers were polymerized to obtain polymers (polyester-based polymers) and where the vinylene carbonate (VC) and the succinic acid anhydride were added, had excellent high-temperature cycle characteristics of 73% to 77%, while the cells of Comparative Examples 6, 7, and 9, where only polyether-based monomers were polymerized to obtain polymers (polyether-based polymers) and where the vinylene carbonate (VC) was added, had significantly low high-temperature cycle characteristics of 35% to 43%.

This can be considered as follows. With the polyether-based polymer, the vinylene carbonate is decomposed since the polyether-based polymer does not function to inhibit the decomposition. This is followed by gas generation, which in turn causes reduction in contactivity of the electrode plates and in capacity. The polyester-based polymer, on the other hand, inhibits the decomposition of the vinylene carbonate. The effect of inhibiting the decomposition of the vinylene carbonate contributes to improve the high-temperature cycle characteristics.

2) In contrast to the excellent high-temperature cycle characteristics of 73% to 77% for the cells of Examples 1 to 7, those of Comparative Examples 5 and 8, where only polyether-based monomers were polymerized to obtain polymers (polyether-based polymers) and where the vinylene carbonate was not added, had significantly low high-temperature cycle characteristics of 32% to 40%.

This can be considered as follows. If the vinylene carbonate is not contained, the negative electrode and the non-aqueous solvent react with each other and generate a gas, which causes reduction in contactivity of the electrode plates and in capacity. On the other hand, if the vinylene carbonate is contained, it forms a coating film on the negative electrode surface, which inhibits the reaction of the non-aqueous solvent and the negative electrode. The effect of inhibiting the reaction of the non-aqueous solvent and the negative electrode contributes to improve the high-temperature cycle characteristics.

3) The cells of Examples 8 and 9, which differed from each other only in the mixture ratios of polyester-based monomer and the polyether-based monomer, had high-temperature cycle characteristics of 81% and 82%, which did not significantly vary. Additionally, the cells of Examples 8 to 9 were superior to the cells of Examples 1 to 7, which used only the polyester-based monomer and had high-temperature cycle characteristics of 74% to 77%.

This can be considered as follows A polymer that has in its structure the polyether-based monomer interacts with the non-aqueous solvent in an active manner, and thus realizes a uniform polymer electrolyte with less phase separation. As a result, uneven reactions in the cell are inhibited. It can be seen that when the ratio of the polyester-based monomer is equal to or higher than 30% by volume of the entire monomer components the decomposition of the vinylene carbonate is sufficiently inhibited and thus high cycle characteristics are obtained.

4) The cell of Comparative Example 4, which had the same composition as that of the cell of Example 8 except for not including the vinylene carbonate, and the cell of Comparative Example 1, which had the same composition as that of the cell of Example 8 except for not including the succinic acid anhydride and vinylene carbonate, had high-temperature cycle characteristics of 44% and 53%, which were significantly lower than 81% for the cell of Example 8.

This can be considered as follows. In Example 8 the vinylene carbonate formed a coating film on the negative electrode surface, which inhibited the reaction of the non-aqueous solvent and the negative electrode, whereas in Comparative Examples 1 and 4 the vinylene carbonate was not contained and thus the non-aqueous solvent and the negative electrode reacted. This was followed by gas generation, which caused reduction in contactivity of the positive and negative electrodes and in the capacity of the comparative cells.

5) The cell of Comparative Example 2, which had the same composition as that of the cell of Example 8 except for not including the succinic acid anhydride, had high-temperature cycle characteristics of 48%, which was significantly lower than 81% for the cell of Example 8.

This can be considered as follows. If the succinic acid anhydride is not contained, the polyester-based polymer and the negative electrode react with each other and generate a gas, which causes reduction in contactivity of the positive and negative electrodes and in capacity. On the other hand, if the succinic acid anhydride is contained, it forms a coating film on the negative electrode surface, which inhibits the reaction of the polyester-based polymer and the negative electrode. The effect of inhibiting the reaction of the polyester-based polymer and the negative electrode contributes to improve the high-temperature cycle characteristics.

6) The cell of Example 4, which used the compound represented by Formula 3, where R was a hydrogen atom, and the cell of Example 5, which used the compound represented by Formula 3', where R was a methyl group, had high-temperature cycle characteristics of 74% and 77%, which did not significantly vary.

This indicates that R may be a hydrogen atom or a methyl group (the monomer is acrylate or methacrylate); in either case, a cell provided with good high-temperature cycle characteristics is obtained.

7) The cell of Example 4, which used the compound represented by Formula 3, where m=2, and the cell of Example 6, which used the compound represented by Formula 3", where m=4, had high-temperature cycle characteristics of 75% and 77%, which did not significantly vary.

This indicates that the high-temperature cycle characteristics are not relative to the repetition number of the alkylene ester.

8) The high-temperature cycle characteristics of the cells of Example 8 and Comparative Example 2, which used only lithium cobalt oxide, were higher than those of the cells of Example 10 and Comparative Example 3, which used a mixture of lithium cobalt oxide and lithium manganese oxide at a volume ratio of 1:1, by 9 and 14 percentage points.

This can be considered as follows. Since the charge and discharge cycle was performed at a high temperature of 70° C., the manganese was dissolved into the electrolyte. The dissolved manganese then degraded the electrolyte, resulting in a reduction in cell capacity.

9) The cells of Examples 8, 13, and 14, which differed from each other only in the kinds of the cyclic acid anhydride, had high-temperature cycle characteristics of 78% to 81%, which did not significantly vary. This indicates that any kind of the cyclic acid anhydride realizes excellent high-temperature cycle characteristics.

10) The cells of Examples 8, 11, and 12, which differed from each other only in the added amounts of the succinic acid anhydride, had high-temperature cycle characteristics of 78% to 82%, which did not significantly vary.

11) The cells of Examples 8 and 15 to 17, which differed from each other only in the added amounts of the vinylene carbonate, had high-temperature cycle characteristics of 72% to 81%, which did not significantly vary.

Supplementary Remarks

1) While in the above Examples succinic acid anhydride, glycolic acid anhydride, and glutaric acid anhydride were used as the cyclic acid anhydride, it will be appreciated that there are alternatives, including aromatic cyclic acid anhydrides such as phthalate acid anhydride and 3-methyl phthalate acid anhydride; and cyclic acid anhydrides that have in the cyclic portions an unsaturated bond such as maleic acid anhydride and methyl maleic acid anhydride. Also contemplated are cyclic acid anhydrides represented by the following Formula 1 such as methyl succinic acid anhydride, 2,2-dimethyl succinic acid anhydride, 1,2-cyclohexane dicarboxylic acid anhydride, cis-1,2,3,6-tetrahydro glutaric acid anhydride, phenyl succinic acid anhydride, 2-phenyl glutaric acid anhydride, and nonenyl succinic acid anhydride. These alternatives provide similar advantageous effects.

Formula 1 where n=0 to 4; R1, R2, R3, and R4 are independently a hydrogen atom, an alkyl group (straight chained or branched), an alkenyl group, or an aryl group; and R5 and R6 are independently a hydrogen atom or an alkyl group (straight chained or branched) with four or less carbon atoms in every repeat unit.

It should be noted, however, that an excessively large amount of the cyclic acid anhydride will lower cell performance and an excessively small amount of the cyclic acid anhydride will not sufficiently realize the desired effect. In view of this, the added amount of the cyclic acid anhydride is preferably 0.01 to 10 parts by mass, and more preferably 0.05 to 5 parts by mass per 100 parts by mass of the polymer electrolyte.

2) While in the above Examples vinylene carbonate was used as the vinylene carbonate derivative, methyl vinylene carbonate or ethyl vinylene carbonate may be used in which one or both of the hydrogen atoms of the vinylene carbonate is substituted with an alkyl group (a straight chained or branched alkyl group with 1 to 4 carbon atoms). It should be noted, however, that an excessively large amount of the vinylene carbonate derivative will increase the resistance of the coating film formed on the negative electrode and thus lower cell performance and an excessively small amount of the vinylene carbonate derivative will not sufficiently realize the desired effect. In view of this, the added amount of the vinylene carbonate derivative is preferably 0.01 to 10 parts by mass, and more preferably 0.05 to 5 parts by mass per 100 parts by mass of the polymer electrolyte.

3) While in the above Examples ethylene carbonate, propylene carbonate, and diethyl carbonate were used as the non-aqueous solvent, it will be appreciated that there are alternatives. For instance, carbonates such as dimethyl carbonate and butylene carbonate, lactones such as γ-butyrolactone and γ-valerolactone, ethers such as γ-dimethoxyethane, tetrahydrofuran, and 1,4-dioxane, ketones such as cyclohexanone, and esters such as ethyl formate and methyl acetate may be used alone or in combination. Preferred among these are carbonates, lactones, ethers, and ketones. Carbonates are particularly preferred.

For a uniform polymer electrolyte with less phase separation realized by an enhanced interaction of the polyester-based polymer and the non-aqueous solvent, the relative permittivity of the non-aqueous solvent is preferably 25 or higher.

4) While in the above Examples the positive electrode active material was made of lithium cobalt oxide ($LiCoO_2$) or a mixture of lithium cobalt oxide and spinel-type lithium manganese oxide ($LiMn_2O_4$), other lithium-containing transition metal oxides may be used such as lithium nickel oxide ($LiNiO_2$) and lithium metal oxide ($LiFeO_2$), or these can be mixed. Also contemplated are lithium-containing transition metal oxides such as $LiCo_{0.5}Ni_{0.5}O_2$, which has another metal element in its crystal lattice. To inhibit the dissolution of the manganese into the electrolyte solution, the composition ratio of the lithium manganese oxide is preferably 0% to 60% by volume.

5) While in the above Examples graphite was used for the negative electrode active material, it may be made of carbon black, coke, glass carbon, carbon fiber, or carbonaceous substances such as calcined structures of the foregoing. Also contemplated are lithium alloys, metal oxides capable of intercalating and deintercalating lithium, silicon, silicon compounds, and the like.

6) As the electrolyte salt, $LiN(C_2F_5SO_2)_2$, $LiN(CF_3SO_2)_2$, $LiClO_4$, $LiPF_6$, or $LiBF_4$ may be used alone, or two or more of the foregoing may be mixed. $LiPF_6$, and $LiBF_4$ are particularly preferred. The amount thereof dissolved in the non-aqueous solvent is preferably 0.5 to 2.0 mole/liter.

7) The polyester-based monomer and the polyether-based monomer are not limited by the functional groups and the repetition numbers specified in the above Examples; in Formulas 1 to 8 above and below, R may be a hydrogen atom or a methyl group, R1 may be a methyl group or an ethyl group, A1 may be an alkylene group (straight chained or branched) represented by $C_nH_n$ with two or more carbon atoms, A2 may be an alkylene group (straight chained or branched) represented by $C_pH_p$ with two or more carbon atoms, and m may be an integer of 1 or greater. As the polyether-based monomer, compounds represented by the following Formulas 5, 7, and 8 may be used as a substitute for the compound represented by Formula 6 used in the above Examples. The polyester-based monomer may be a mixture of two or more different polyester-based monomers and the polyether-based monomer may be a mixture of two or more different polyether-based monomers. It should be noted, however, that Formulas 1 to 8 above and below are examples of the polyester-based monomer and the polyether-based monomer and that a different structure may be employed.

Formula 5

8) The composition ratio of the polyester-based monomer and the polyether-based monomer is not limited to the range specified in the above Examples. Nevertheless, to inhibit the decomposition of the vinylene carbonate and to enhance the interaction with the non-aqueous solvent, the composition ratio is preferably in the range of 100:0 to 10:90, more preferably 60:40 to 15:85, and most preferably 40:60 to 20:80.

9) While in the above Examples 93 parts by mass of the electrolyte solution was mixed with 7 parts by mass of the polymerizable monomer (7% by mass), this ratio is not to be restrictive. The mass of the polymerizable monomer should be in the range of 1.5 to 30 per 100 total mass of the electrolyte solution and the monomer.

10) While in the above Examples t-butyl peroxy pivalate was blended at 5000 ppm as the polymerization initiator, other organic peroxides may be used such as diacyl peroxide, peroxy ester, dialkyl peroxide, peroxy ketal, peroxy dicarbonate, peroxy monocarbonate, and t-hexyl peroxy pivalate. Additionally, the composition ratio is not limited to 5000 ppm. Further, the polymerization initiator is not essential for polymerization, which can also be performed by heating, UV rays radiation, or the like.

11) Various additives (e.g., vinyl ethylene carbonate derivative and ethylene sulfite derivative) for improving cell characteristics may be added.

As has been described above, the present invention provides a cell that excels in high-temperature cycle characteristics and that is light-weight.

What is claimed is:
1. A non-aqueous electrolyte cell comprising:
   a positive electrode;
   a negative electrode; and
   a polymer electrolyte, wherein:
   the polymer electrolyte is formed from a prepolymer electrolyte having a prepolymer wherein the prepolymer is polymerized, the prepolymer electrolyte further comprising a non-aqueous solvent and an electrolyte salt;
   the prepolymer includes a polyester-based monomer; and
   the prepolymer electrolyte further includes a vinylene carbonate derivative and cyclic acid anhydride, said cyclic acid anhydride is a component separate from the polyester-based monomer;
   wherein the polyester-based monomer is at least one selected from the group consisting of the following formulas 1,2,3,3',3" and 4;

Formula 1

R:H, R1:$CH_3$, A1:$C_5H_{10}$, m=6;

Formula 2

R2:H, A2:$C_5H_{10}$, m1=4;

Formula 7

Formula 8

Formula 3

R: H, A1: $C_5H_{10}$, m = 2

Formula 3'

R: $CH_3$, A1: $C_5H_{10}$, m = 2

Formula 3''

R: $CH_3$, A1: $C_5H_{10}$, m = 4

Formula 4

R: H, A1: $C_5H_{10}$, m = 4

2. The non-aqueous electrolyte cell according to claim 1, wherein the cyclic acid anhydride is a compound represented by the following Formula 10:

Formula 10 where n=0 to 4; R1, R2, R3, and R4 are independently a hydrogen atom, a straight chained or branched alkyl group, an alkenyl group, or an aryl group; and R5 and R6 are independently a hydrogen atom or a straight chained or branched alkyl group with four or less carbon atoms in every repeat unit.

3. The non-aqueous electrolyte cell according to claim 1, wherein an active material for the negative electrode is a carbonaceous substance with a d(002) value of 0.340 nm or lower.

4. The non-aqueous electrolyte cell according to claim 1, wherein the prepolymer further includes polyether acrylate and/or polyether methacrylate.

5. The non-aqueous electrolyte cell according to claim 1, wherein an added amount of the cyclic acid anhydride is 0.5-2.0% by weight.

* * * * *